United States Patent
Doi et al.

(10) Patent No.: US 6,707,630 B2
(45) Date of Patent: Mar. 16, 2004

(54) METHOD FOR MANAGING A LIFE OF A STORAGE MEDIUM, STORAGE DEVICE, STORAGE SYSTEM, AND STORAGE MEDIUM

(75) Inventors: Koichi Doi, Kawasaki (JP); Kenichi Ogura, Kawasaki (JP); Akihito Ohki, Kawasaki (JP); Takashi Miyako, Kawasaki (JP); Youichi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/101,354

(22) Filed: Mar. 20, 2002

(65) Prior Publication Data

US 2002/0126410 A1 Sep. 12, 2002

Related U.S. Application Data

(63) Continuation of application No. PCT/JP99/05436, filed on Sep. 30, 1999.

(51) Int. Cl.$^7$ ............................................... G11B 15/18
(52) U.S. Cl. ........................................ 360/69; 360/74.5
(58) Field of Search .................. 360/69, 74.5; 713/323, 713/200; 235/380; 386/95; 702/130

(56) References Cited

U.S. PATENT DOCUMENTS

| | | | | |
|---|---|---|---|---|
| 5,448,426 A | * | 9/1995 | Dahlerud | 360/69 |
| 5,819,100 A | * | 10/1998 | Pearce | 713/323 |
| 5,867,809 A | * | 2/1999 | Soga et al. | 702/130 |
| 6,055,636 A | * | 4/2000 | Hillier et al. | 713/236 |
| 6,246,829 B1 | * | 6/2001 | Nakagawa | 386/95 |
| 6,246,919 B1 | * | 6/2001 | Hassel | 700/116 |
| 6,321,983 B1 | * | 11/2001 | Katayanagi et al. | 235/380 |
| 6,425,042 B1 | * | 7/2002 | Ikeda et al. | 360/74.5 |

FOREIGN PATENT DOCUMENTS

| | | |
|---|---|---|
| JP | 49-16046 | 4/1974 |
| JP | 59-186107 | 10/1984 |
| JP | 63-26802 | 2/1988 |
| JP | 2-278562 | 11/1990 |
| JP | 3-194774 | 8/1991 |
| JP | 4-285772 | 10/1992 |
| JP | 5-307877 | 11/1993 |
| JP | 6-175939 | 6/1994 |
| JP | 7-320473 | 12/1995 |
| JP | 8-180603 | 7/1996 |
| JP | 10-254649 | 9/1998 |

OTHER PUBLICATIONS

Partial English translation of Japanese Patent Publication No. 6–175939.

* cited by examiner

*Primary Examiner*—David Hudspeth
*Assistant Examiner*—Fred F. Tzeng
(74) *Attorney, Agent, or Firm*—Staas & Halsey LLP

(57) ABSTRACT

A storage medium life management method, storage device and storage system detect the life of a storage medium. Medium life management information indicating the read/write state of a medium is recorded on the storage medium. A drive reads out the medium life management information from the storage medium when the storage medium is loaded, and updates the medium life management information pursuant to the operation of at least one of the reading and writing of storage medium. Then, the drive writes medium life management information to the storage medium when the storage medium s unloaded. This medium life management information is used for determination of the life of a medium in either a drive or host. Since management information corresponding to an actual read/write state can be obtained, the deterioration of a storage medium can be accurately detected.

21 Claims, 14 Drawing Sheets

FIG. 4

| | +00 | +01 | +02 | +03 | +04 | +05 | +06 | +07 (Hex) |
|---|---|---|---|---|---|---|---|---|
| +00 | Ver:0x0 1 | THRESHOLD CODE | HISTORY NUMBER OF THRESHOLD REACH | HISTORY NUMBER OF MACHINE (HEAD SERIAL NUMBER) | START DATE OF UTILIZATION OF MEDIUM | | | |
| +08 +10 | MTC Firm VERSION NUMBER ||||||||
| +38 +40 +48 | HISTORY OF THRESHOLD REACH (16 TIMES THRESHOLD REACH FROM MOST RECENT) ||||||||
| +140 | MACHINE NUMBER(HEAD SERIAL NUMBER) (MOST RECENT ~ BEFORE 15 TIMES) ||||||||
| +200 | AVERAGE OF READ DATA ERROR |||| AVERAGE OF WRITE DATA ERROR RATE (UNIT:K BYTE/ONE RETRY) ||||
| +208 | AVERAGE OF TRACKING ERROR RATE (UNIT:K BYTE +310/ONE SDM WRITE) |||| | | | |
| +2C0 | TAPE TRAVELING PATH |||| TAPE TRAVELING PATH(UNIT:PATH) ||||
| +2C8 | TOTAL NUMBER OF PROCESSING(WRITE UNIT:K Bytes) |||| TOTAL NUMBER OF PROCESS BYTE(Read UNIT:K Bytes) ||||
| +300 | NUMBER OF SDM WRITE(UNIT:NUMBER) |||| NUMBER OF SERVO RETRY(UNIT:NUMBER) ||||
| +308 | NUMBER OF INITIAL HEAD RETRY(UNIT:NUMBER) |||| HISTRICAL NUMBER OF TRACKING ERROR RATE | | | |
| +310 | Information of tracking Error Rate (Most recent ~ before 16 times) (UNIT:K bytes/one SDM write) ||||||||
| +400 | HISTORICAL NUMBER OF PROCESS BYTE OF ONE VOLUME (write) | HISTORICAL NUMBER OF PROCESS BYTE OF ONE VOLUME (read) | HISTORICAL NUMBER OF WRITE ERROR RATE | HISTORICAL NUMBER OF READ ERROR RATE | HISTORICAL NUMBER OF READ REVERSE ERROR RATE | | | |
| +418 . +440 | NUMBER OF PROCESS BYTE OF ONE VOLUME (write from most recent to 16 times before K bytes) ||||||||
| +450 . +480 | NUMBER OF PROCESS BYTE OF ONE VOLUME (read from most recent to 16 times before K bytes) ||||||||

FIG. 5

| Offset | | |
|---|---|---|
| +490 | NUMBER OF BLOCK TO HAVE BEEN WRITTEN (UNIT:Device Block) | NUMBER OF BLOCK TO HAVE BEEN READ (UNIT:Device Block) |
| +498 | TOTAL NUMBER OF RETRY DURING WRITE (UNIT:NUMBER) | TOTAL NUMBER OF RETRY BLOCK DURING WRITE (UNIT:NUMBER) |
| +4A0 | NUMBER OF ECC CORRECTION DURING WRITE (UNIT:Device Block) | UNUSED |
| +4A8 | TOTAL NUMBER OF RETRY DURING READ (UNIT:NUMBER) | TOTAL NUMBER OF RETRY BLOCK DURING READ (UNIT:NUMBER) |
| +4B0 | NUMBER OF ECC CORRECTION DURING READ (UNIT:Device Block) | UNUSED |
| +4B8 | TOTAL NUMBER OF RETRY DURING READ REVERSE(UNIT:NUMBER) | TOTAL NUMBER OF RETRY BLOCK DURING READ REVERSE(UNIT:NUMBER) |
| +4C0 | NUMBER OF ECC CORRECTION DURING READ REVERSE(UNIT:Device Block) | |
| +4C8 | UNUSED ||
| +4D8 . +500 | ERROR RATE INFORMATION DURING WRITE (FROM MOST RECENT TO 16 TIMES BEFORE UNIT K BYTES/ONE RETRY READ) ||
| +518 . | ERROR RATE INFORMATION DURING READ (FROM MOST RECENT TO 16 TIMES BEFORE UNIT K BYTES/ONE RETRY READ) ||
| +558 . +580 | ERROR RATE INFORMATION DURING READ REVERSE (FROM MOST RECENT TO 16 TIMES BEFORE UNIT K BYTES/ONE RETRY READ) ||

FIG. 12

| CHECK ITEMS | PERFORMANCE-ORIENTED | MEDIUM-ORIENTED |
|---|---|---|
| TAPE TRAVELING PATH | × | ○ |
| AVERAGE OF WRITE DATA RATE ERROR | ○ | ○ |
| AVERAGE OF TARACKING ERROR RATE | ○ | ○ |
| MINIMUM BYTE NUMBER OF PROCESS(BYTE NUMBER OF READ/WRITE PER ONE VOLUME) | ○ | ○ |
| NUMBER TO BE SHOULD OVER NUMBER OF MINIMUM PROCESS BYTE BETWEEN MOST RECENT NUMBER OF WRITE PROCESS BYTE FROM ONE OF PAST 15 TIMES WHEN CHECKING AVERAGE OF WRITE DATA ERROR RATE | ○ | ○ |

FIG. 13

| THRESHOLD REACH CODE | ITEM |
|---|---|
| 0x00 | NOT NECESSARY THRESHOLD READ |
| 0x01 | NOT NECESSARY THRESHOLD READ |
| 0x12 | AVERAGE OF WRITE ERROR DATA RATE IS OVER SPECIFIED VALUE IN PERFORMANCE-ORIENTED MODE |
| 0x13 | AVERAGE OF WRITE DATA ERROR RATE IS OVER SPECIFIED VALUE AND NUMBER OF TAPE TRAVELING PATH IS OVER SPECIFIED VALUE |
| 0x14 | NUMBER THAT AVERAGE OF WRITE DATA ERROR RATE IS OVER LIMITED VALUE IS OVER A SPECIFIED VALUE IN HISTORY OF WRITE DATA ERROR RATE |
| 0x22 | AVERAGE OF TRACKING ERROR RATE IS OVER SPECIFIED VALUE IN PERFORMANCE-ORIENTED MODE |
| 0x23 | AVERAGE OF TRACKING ERROR RATE IS OVER SPECIFIED VALUE AND NUMBER OF TAPE TRAVELING PATH IS OVER SPECIFIED VALUE |
| 0x24 | NUMBER THAT AVERAGE OF TRACKING ERROR RATE IS OVER IS OVER LIMITED VALUE IN HISTORY OF TRACKING ERROR RATE |
| 0x32 | AVERAGE OF READ/READ REVERSE ERROR RATE IS OVER SPECIFIED VALUE IN PERFORMANCE-ORIENTED MODE |
| 0x33 | AVERAGE OF READ/READ REVERSE ERROR RATE IS OVER SPECIFIED VALUE AND NUMBER OF TAPE TRAVELING PATH IS OVER SPECIFIED VALUE |
| 0x34 | NUMBER THAT AVERAGE OF READ/READ REVERSE RATE IS OVER LIMITED VALUE IS OVER A SPECIFIED VALUE IN HISTORY OF TRACKING ERROR RATE |

警告 :xxxx :カートリッジの交換要求が発生しました。
　　　:VOLUME=XXXXXX　　　　　　　　　DRIVE=XXXXXX
WARNING :xxxx : THE DRIVE REQUESTED TO RENEW THE CARTRIDGE
　　　:VOLUME=XXXXXX　　　　　　　　　DRIVE=XXXXXX

```
警告 :xxxx :カートリッジの交換要求が発生しました。
      :VOLUME=XXXXXX    LIBRARY=XXXXXX    DRIVE=XXXXXX
WARNING :xxxx : THE DRIVE REQUESTED TO RENEW THE CARTRIDGE
      :VOLUME=XXXXXX    LIBRARY=XXXXXX    DRIVE=XXXXXX
```

METHOD FOR MANAGING A LIFE OF A STORAGE MEDIUM, STORAGE DEVICE, STORAGE SYSTEM, AND STORAGE MEDIUM

This application is a continuation of PCT/JP99/05436 filed on Sep. 30, 1999.

TECHNICAL FIELD

The present invention relates to a method of managing a life of a storage medium for storing data, storage device, storage system and storage medium, and more particularly to a storage medium life management method, storage device, storage system and storage medium for determining the life of a storage medium pursuant to utilizing a removable storage medium.

BACKGROUND ART

Storage media capable of being loaded into and unloaded from storage drives are used widely. A memory cartridge is a typical such storage medium. The memory cartridge has a structure formed by housing a data-storing storage medium in a cartridge case. Memory cartridges such as this include magnetic disk cartridges, optical disk cartridges, magneto-optical disk cartridges, and magnetic tape cartridges. A memory cartridge is loaded into a drive, and then the drive head accesses the storage medium in the memory cartridge to perform read/write operations. After read/write operation, the memory cartridge is ejected from the drive.

This storage medium has a life. For a storage medium whose life has expired, there is the danger that data will not be able to be read. For this reason, technology for managing the life of a storage medium has become necessary.

As methods for managing the life of this storage medium, the following prior methods have been known.

(1) A drive writes the utilization start time into a memory cartridge, and manages the life of the memory cartridge by the elapsed time from the utilization start time.

(2) A drive writes the number of loads into a memory cartridge, reads out the number of loads, and manages the life of the memory cartridge according to the number of loads.

However, the problem has been that a method for managing life by the time that elapses from a utilization start time and a method for managing life by the number of loads do not necessarily show the deterioration of the storage medium or the deterioration of the data on the storage medium. That is, in addition to performance deterioration resulting from age deterioration of the storage medium itself, the life of a storage medium also deteriorates as a result of the storage medium being used. For example, the surface of a magnetic tape is worn by coming in contact with a magnetic head, causing performance to deteriorate. Also, dust and the like adhere to the surface of the tape, causing performance to deteriorate. Phenomena such as this also occur for disks and other media besides tape.

For the prior art, the life of a storage medium was determined to be over when a specified utilization period elapsed even if only one data-write operation had been performed. Or, the life of a storage medium was determined to be over when a specified number of loads had been exceeded even though only a small quantity of data was accessed on the storage medium at each load. In cases such as these, there was practically no deterioration of the storage medium. Thus, the replacement of the storage medium had to be carried out despite the fact that the storage medium had not deteriorated. This was a problem because it wastefully increased the costs of storage media for users.

By contrast, when the utilization frequency of a storage medium is extremely high, or when there is a large volume of input/output data at each load, the medium deteriorates prior to a specified value for a utilization period or number of loads. Consequently, the problem was that loss of user data and other such problems occurred before the specified value for a utilization period or number of loads.

Furthermore, the results of a determination of the life of a storage medium were only displayed on the indicator of the storage device thereof, and were not communicated to the management system of this storage device. An operator had to look at the indicator content of a storage device to manage the life of a storage medium. Thus, the problem was that a host or other management system could not manage the life. For automated storage systems such as a library system in particular, managing the life of a storage medium was really difficult.

Therefore, an object of the present invention is to provide a storage medium life management method, storage device, storage system, and storage medium for determining life based on the deterioration of the storage medium.

Further, an object of the present invention is to provide a storage medium life management method, storage device, storage system, and storage medium for preventing the wasteful replacement of a storage medium and loss of data.

Furthermore, an object of the present invention is to provide a storage medium life management method, storage device, storage system, and storage medium for collecting management information, which indicates life based on the deterioration of a storage medium.

Furthermore, an object of the present invention is to provide a storage medium life management method, storage device, storage system, and storage medium for automatically determining life according to the deterioration of a storage medium.

Furthermore, an object of the present invention is to provide a storage medium life management method, storage device, storage system, and storage medium for determining life according to the deterioration of a storage medium for an automated storage system as well.

DISCLOSURE OF THE INVENTION

The present invention is a storage device for accessing a loaded storage medium, and reading and writing data to and from the above-mentioned storage medium. And the method for managing the life of this storage medium comprises the steps of reading medium life management information from the above-mentioned loaded storage medium; detecting an operating condition of at least one of the reading and the writing of data in the above-mentioned storage medium, and updating the above-mentioned medium life management information in accordance with results of such detection; and writing the above-mentioned updated medium life management information to the above-mentioned storage medium upon unloading the storage medium.

In the present invention, based on the experience that the life of a storage medium is related to actual read/write operations, the operating condition of at least one of the reading and the writing of a storage medium is detected, and the detected result is utilized in the information for managing the life of a medium. Then, by storing this medium life management information on the storage medium, reading it out at loading time, updating it, and then rewriting it to the storage medium, a history of management information is retained on the storage medium. Because operating conditions, such as operating time, number of data errors and number of servo errors at read/write are treated as management information, the deterioration of a storage medium can be accurately detected. Thus, it is possible to prevent wasteful storage medium replacement and data loss.

Another aspect of the present invention further comprises a step for reporting the above-mentioned medium life management information to a management device for managing the life of the above-mentioned storage medium. Thus, a determination of life becomes possible by a management device that is separate from a storage device, making it easy for an operator to confirm the life of a storage medium.

Another aspect of the present invention further comprises a step for analyzing the above-mentioned medium life management information and determining the life of the above-mentioned storage medium. Because the life of a storage medium is also determined, this determination can be displayed on a storage device indicator or a management device, and an operator can be prompted to replace a storage medium.

Another aspect of the present invention further comprises a step for setting determination parameters for the above-mentioned determination step. Since it is possible to change a determination condition, a life determination can be executed in accordance with a user request.

Another aspect of the present invention further comprises a step for reporting the above-mentioned determination results to a management device for managing the life of the above-mentioned storage medium. Because the determination results are reported to a management device that is separate from the storage device, the management device can manage the life of a storage medium. For this reason, managing the life of a storage medium can be automated by an automatic storage system using the management device.

In another aspect of the present invention, the above-mentioned updating step comprises steps for detecting a plurality of states of at least one of the reading and the writing of data in the above-mentioned storage medium, and for updating the above-mentioned medium life management information in accordance with each of the above-mentioned plurality of states.

Since a plurality of states are detected and treated as management information, the deterioration of a storage medium can be determined from a variety of perspectives.

Another aspect of the present invention also has steps for analyzing each of the plurality of states of the above-mentioned medium life management information, and for determining the life of the above-mentioned storage medium from the results of each analysis. Because a determination is made by combining the results of respective analyses of a plurality of states, a variety of factors can be analyzed, making possible an accurate life determination.

In another aspect of the present invention, the above-mentioned determination step comprises steps for determining the life of the above-mentioned storage medium based on the above-mentioned respective analyses results, and detecting the reason for the above-mentioned determination. Since the reason for a determination is also detected, deterioration factors can be communicated to an operator, and the operator can make an accurate decision about replacement.

In another aspect of the present invention, the above-mentioned updating step comprises steps for detecting an operating quantity of at least one of the reading and the writing of data when data is read or written from/to the above-mentioned storage medium, and for updating the above-mentioned medium life management information according to results of such detection. Since operating quantities such as operating time or number of operating paths, constitute medium deterioration factors, a determination of medium life is made by detecting these factors.

In another aspect of the present invention, the above-mentioned updating step comprises steps for detecting data error states of at least one of the reading and the writing of data when data is read or written from/to the above-mentioned storage medium, and for updating the above-mentioned medium life management information according to the detection results. Since data error states, such as the number of data errors, directly affect the read/write performance of a storage medium, a determination can be made regarding the deterioration of a storage medium regardless of the elapsed time.

In another aspect of the present invention, the above-mentioned updating step comprises steps for detecting head servo error sate of at least one of the reading and the writing of the above-mentioned storage medium data, and for updating the above-mentioned medium life management information according to the detection results. When there are frequent error states of a servo controller for positioning a head on a storage medium, it is possible to make a determination that the storage medium on which the servo information is stored has deteriorated, and it is for this reason that servo error states are used as management information.

In storage system of the present invention, the storage device is constituted by a library system having a storage drive that accesses a loaded storage medium, and reads/writes data from/to the above-mentioned storage medium, and an accessor for loading a desired storage medium into the above-mentioned storage drive, and removing the above-mentioned storage medium from the above-mentioned storage drive. In a library system, in which an accessor performs the handling of a storage medium, because a storage medium is moved around in a closed space inside the device, it is difficult for an operator to see a storage medium and make a determination as to its life. Thus, the storage system of the present invention is constituted such that, by reporting medium life management information to a management device of the library system, the life of a storage medium inside the library system is managed by the management device. For this reason, the life of a storage medium can be easily managed even in an automated storage system just like in the library system, making it possible to incorporate the present invention in an automated system.

BRIEF DESCRIPTION OF THE DRAWINGS

FIG. 4 and FIG. 5 are charts describing medium management information of an embodiment of the present invention;

FIG. 12 is a chart describing threshold reach check items for the constitution of FIG. 1;

FIG. 13 is a chart describing threshold reach codes for the constitution of FIG. 1;

BEST MODE FOR CARRYING OUT THE INVENTION

A life management method, storage device and storage system of the present invention will be explained using a magnetic tape cartridge storage device as an example.

Magnetic Tape Cartridge Storage Device

Figure 1:
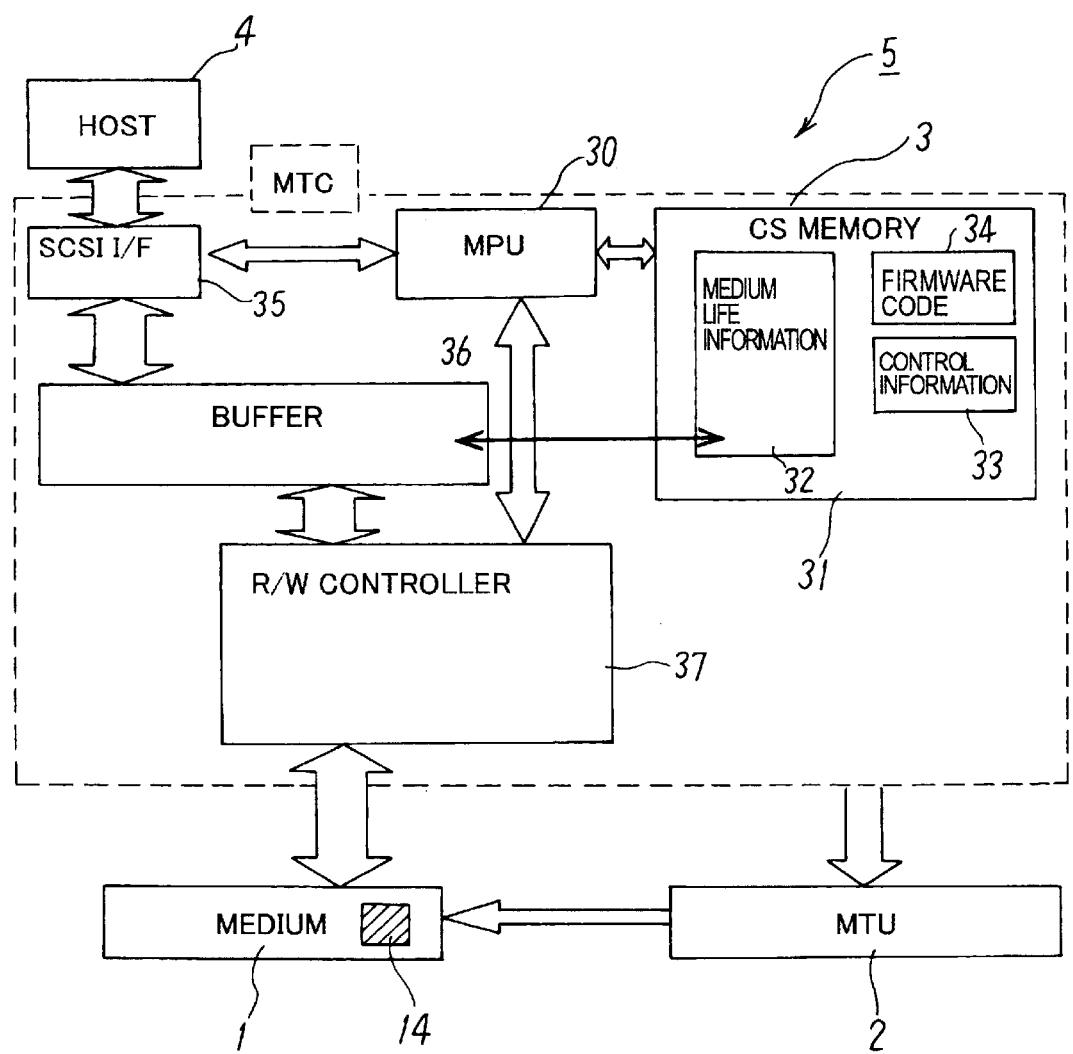
FIG. 1 is a block diagram of a magnetic tape drive of an embodiment of the present invention.
Figure 2:
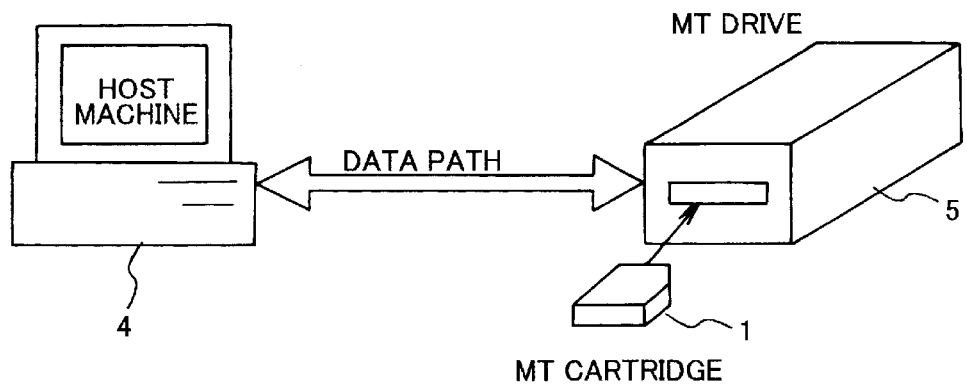
FIG. 2 is a schematic of a magnetic tape storage system of an embodiment of the present invention.
Figure 3:
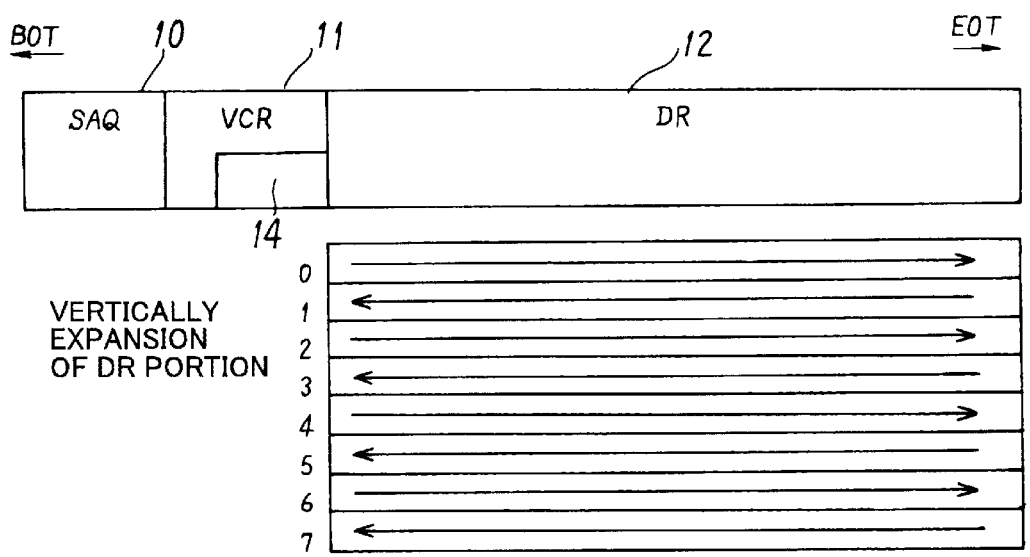
FIG. 3 is the recording format of the magnetic tape of the magnetic tape cartridge of FIG. 2.

FIG. 1 is a block diagram of a magnetic tape cartridge storage drive of an embodiment of the present invention, FIG. 2 is a schematic of a magnetic tape storage system of an embodiment of the present invention, FIG. 3 is the recording format of the magnetic tape of the magnetic tape cartridge of FIG. 2, and FIG. 4 and FIG. 5 are charts describing medium management information of an embodiment of the present invention.

As shown in the system schematic of FIG. 2, a magnetic tape cartridge storage drive (hereinafter referred to as an MT drive) 5 is connected to a host 4, and, in accordance with commands from host 4, performs read/write for a magnetic tape cartridge (hereinafter referred to as a medium) 1. The host 4 constitutes, for example, a personal computer or the like. The medium 1 is constituted by housing a magnetic tape inside a cartridge case, and can be loaded and unloaded into and from MT drive 5.

As shown in FIG. 1, the MT drive 5 is constituted from a magnetic tape drive unit (hereinafter referred to as an MTU) 2, and a magnetic tape controller (referred to as an MTC) 3. MTC 3 controls MTU 2 in accordance with commands from the host, and performs read/write for medium 1. MTU 2 has a magnetic head, a tape unit for loading, running and unloading the magnetic tape of medium 1, a head positioning unit for positioning the magnetic head on the desired track of the magnetic tape, and a process for controlling these.

MTC 3 has a microprocessor (called an MPU) 30 for overall control, CS memory 31, which stores control information, a SCSI (small computer system interface) interface circuit (called an SCSI I/F) 35 for the SCSI interface with host 4, a buffer memory 36, and a read/write control circuit (R/W circuit) 37.

CS memory 31 has a region 34 for storing firmware codes, a region 33 for storing control information, and a Table 32 for storing information for managing the life of a medium, which will be described below. MPU 30 processes commands from host 4 in accordance with the firmware codes and control information on CS memory 31. The flow of information between the medium 1 and the host 4 is host 4—SCSI I/F 35 —buffer memory 36 —R/W circuit 37 —medium 1.

The MTU 2 processor detects servo errors. Further, MTU 2 is controlled by MPU 30, runs medium 1, and positions the magnetic head. R/W circuit 37 sends buffer memory 36 information to the magnetic head, and performs write operations. Further, R/W circuit 37 carries out read control, which transmits data read out by the magnetic head to buffer memory 36 in accordance with the commands of MPU 30. R/W circuit 37 comprises a well-known data error detecting circuit and an ECC (error correcting code) correction circuit.

As shown in FIG. 3, the format of the magnetic tape has, from the BOT (beginning of tape), an SAQ region (Servo Acquisition Region) 10, a VCR region (Volume Control Region) 11, and a DR region (Data Region) 12. SAQ region 10 is the region used for magnetic head servo tracking, and data is not written to this region. The magnetic head is positioned on a track of the magnetic tape based on the servo data of this SAQ region 10. VCR region 11 is the recording region in which medium management information is recorded. The medium life management information 14 of the present invention is recorded in this region 11.

DR region 12 is a user data recording region. DR region 12 is divided vertically into eight regions (paths). These regions are called Halfwraps. The magnetic head accesses the entire DR region by moving in the direction of the arrows shown in FIG. 3 from Halfwrap 0 to Halfwrap 7. For example, each Halfwrap constitutes 16 data channels and three servo channels.

FIG. 4 and FIG. 5 are charts describing relevant medium life management information.

The medium life management information 14 constitutes general life management information, servo error information, and data error information. The general life management information comprises the distance and number of processing bytes read/written on a tape. In other words, it is tape travel time, which is the time that the tape is actually operated during read/write, number of tape travel paths, which is the number of paths that a tape is made to travel during read/write, total number of processing bytes (write), which is the number of bytes read/written to a tape during write operations, and total number of processing bytes (read), which is the number of bytes read/written from a tape during read operations. All of these indicate read/write operation quantities, and are effective for evaluating the deterioration of the tape itself due to use.

Next, servo error information comprises the frequency and history of servo errors that occur while reading/writing from/to a medium. That is, it is SDM (Servo Demark Mark) write frequency, number of servo retries, number of initial head retries, the tracking error rate history, and the average value of the tracking error rate.

As explained hereinabove, the magnetic head is positioned and controlled on a data track by servo information of a magnetic tape servo track. The number of servo retries is the number of times that the magnetic head goes off track from a servo track during a write operation. Further, because SDM indicates a region in which servo tracking cannot be performed, SDM is mark data that is written so as to insert the data track of this region. The start position is called SDM begin, and the end position is called SDM END. SDM write frequency indicates the number of times that the above-mentioned mark is written during write operations.

The magnetic head is positioned in a track direction by servo information of SAQ region 10 of the tape. The number of initial head retries indicates the number of times that initial head retry was performed while positioning the servo according to this SAQ region 10. The tracking error rate is arrived at by dividing the number of bytes (Kbytes) written by the number of SDM write-in (per load). As shown in FIG. 4, tracking error rate information constitutes a history of tracking error rates from the most recent to the one 16 times therebefore. The average value of a tracking error rate is obtained by dividing the above-mentioned prior number of tracking error rates by the number of times the medium has been loaded.

The servo error information thereof enables the deterioration of a medium to be evaluated from the standpoint of performance. That is, the deterioration of tape performance can be detected via servo information written to the tape.

Next, data error information is the number of blocks/number of bytes/number of retries when processing a medium during a single load operation. Data error information comprises the following respective information.

It is the number of read processing bytes and the number of write processing bytes per load during read/write. The number of read processing bytes represents the total number of bytes during a read operation. The number of write processing bytes represents the total number of bytes during a write operation. As shown in FIG. 4, these constitute a history of number of read/write processing bytes from the most recent to that 16 times therebefore.

Moving to FIG. 5, the number of write blocks is the number of device blocks actually written to a medium. The number of read blocks is the number of device blocks actually read from a medium. The total number of write retries is the number of retries that occurred when writing to a medium. The total number of read retries is the number of retries that occurred when reading from a medium. The total number of read reverse retries is the number of retries that occurred when reverse-reading a medium.

The total number of write retry blocks is the number of device block retries that occurred when writing to a medium. The total number of read retry blocks is the number of device block retries that occurred when reading from a medium. The total number of read reverse retry blocks is the number of device block retries that occurred when reverse-reading a medium.

The number of write ECC corrections is the number of ECC corrections during write operations, the number of read ECC corrections is the number of ECC corrections during read operations, and the number of read reverse ECC corrections is the number of ECC corrections during read reverse operations. Read data error rate information indicates the frequency of occurrence of data errors relative to the number of bytes read. Write data error rate information indicates the frequency of occurrence of data errors relative to the number of bytes written. Read reverse data error rate information indicates the frequency of occurrence of data errors relative to the number of read-reverse bytes. As shown in FIG. 5, these data error rates are accumulated in histories from the most recent to the one 16 times therebefore.

As shown in FIG. 4, the average value of a write data error rate is the average value relative to the number of loads for the write data error rate. The average value of a read/read reverse data error rate is the average value relative to the number of loads for the read/read reverse data error rate.

Data error information like this enables the deterioration of a medium to be evaluated from the standpoint of performance. That is, the deterioration of tape performance can be detected by the data information written to the tape.

Furthermore, a medium life-indicating threshold reach code, which will be described below, is also stored as medium life management information (Refer to FIG. 4).

Not all such-general management information, servo error information, and data error information needs to be stored. Rather, this information can be selected as needed in accordance with determination parameters for a life determination, and life analysis conditions.

Magnetic Tape Read/Write Operations

Figure 6:
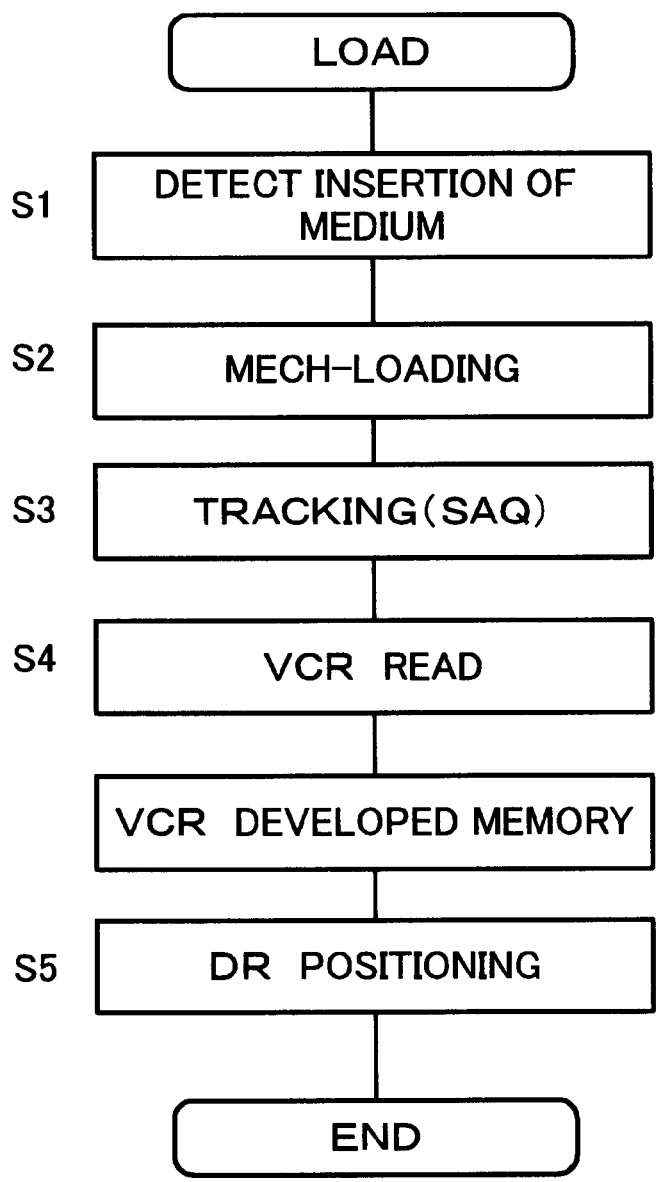
FIG. 6 is a load process flow chart for the constitution of FIG. 1.
Figure 7:
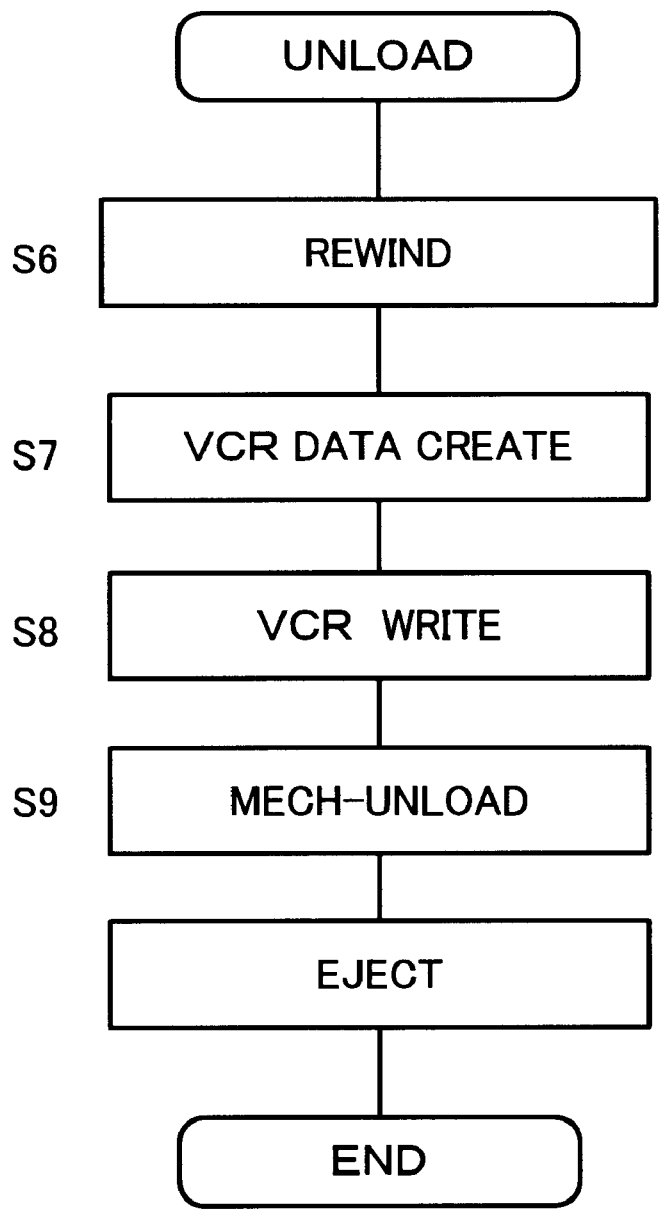
FIG. 7 is an unload process flow chart for the constitution of FIG. 1.
Figure 8:
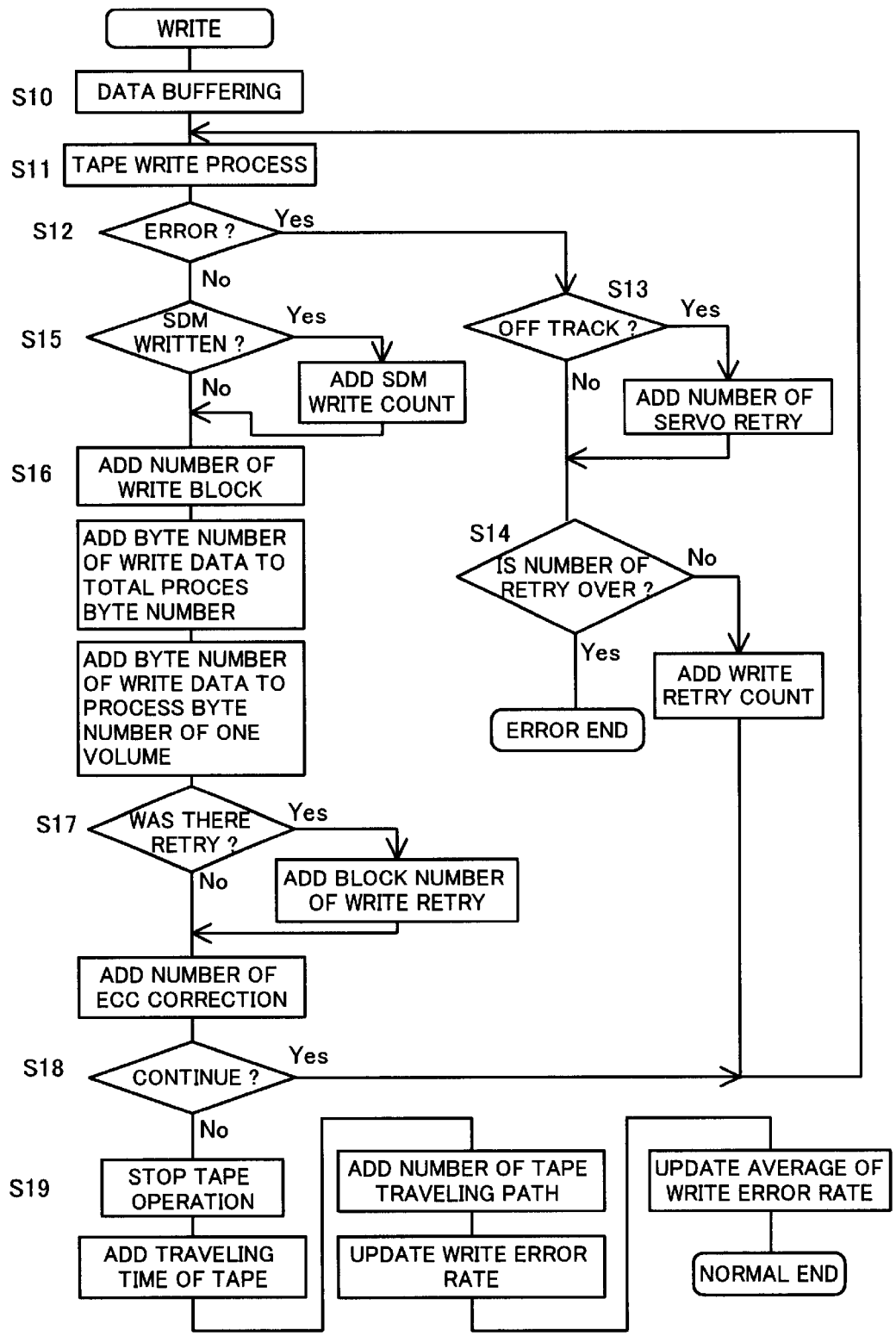
FIG. 8 is a write process flow chart for the constitution of FIG. 1.
Figure 9:
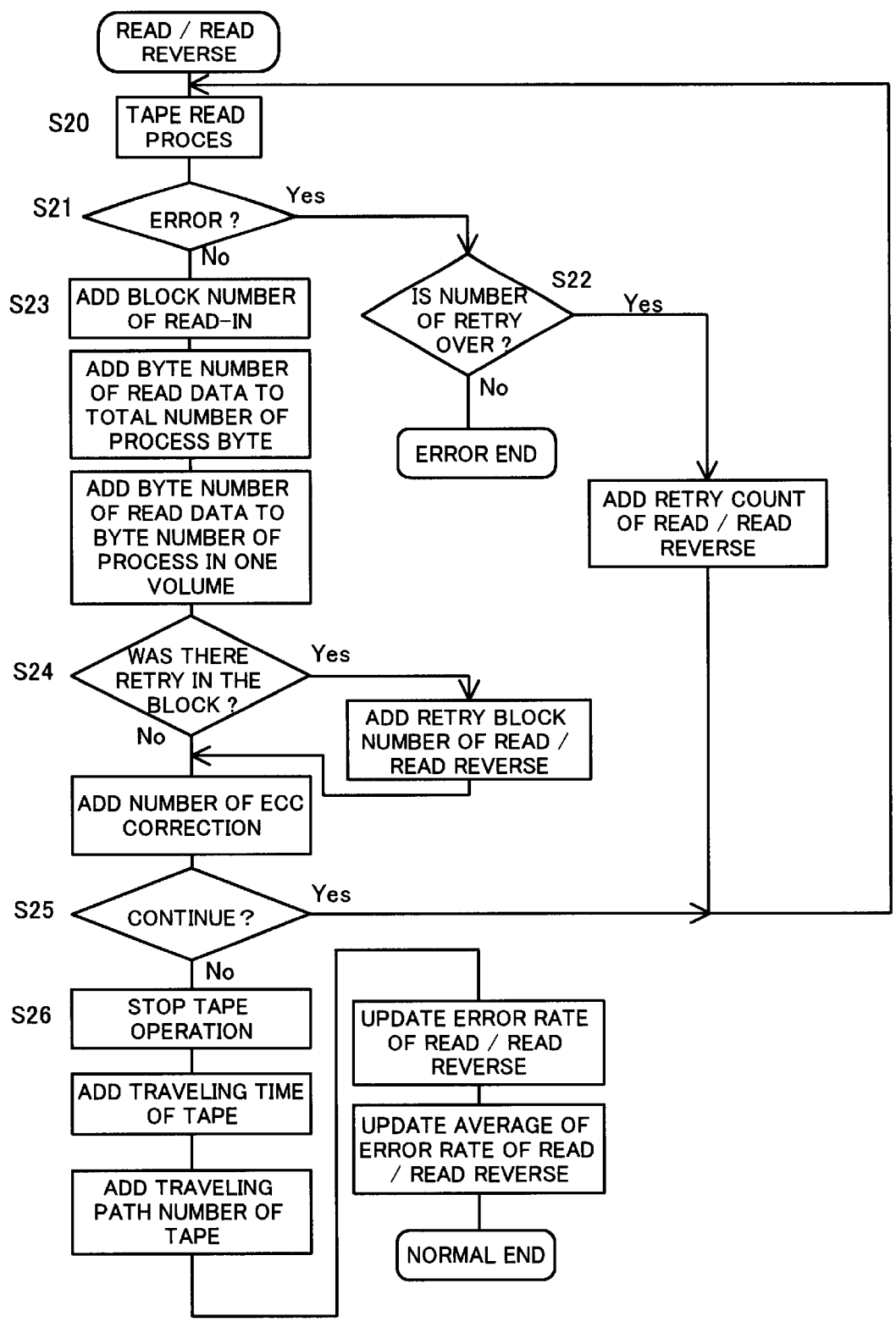
FIG. 9 is a read/read reverse process flow chart for the constitution of FIG. 1.

FIG. 6 is a load process flow chart of when a medium is loaded. FIG. 7 is an unload process flow chart of when a medium is unloaded, FIG. 8 is a write process flow chart, and FIG. 9 is a read/read reverse process flow chart.

A loading operation will be explained using FIG. 6.

(S1) Insertion of the medium 1 into MT drive 5 is detected.

(S2) MTU 2 performs a mechanical loading operation. That is, the magnetic tape is pulled out from medium 1, and wrapped around the drive reel.

(S3) Magnetic head is tracked using SAQ region 10 of medium 1.

(S4) After tracking, the magnetic head reads out the VCR region 11 of the magnetic tape to the buffer memory 36. Then, in accordance with commands from MPU 30, the VCR region 11, which was read to the buffer memory 36, is developed to CS memory 31. In accordance therewith, the medium life management information 14 of VCR region 11 is developed to the Table 32 of CS memory 31.

(S5) Then, MPU 30 positions the magnetic head of MTU 2 to the DR region of the magnetic tape, and terminates the load process. In this state, the MT drive 5 is waiting for a read/write command from the host.

An unloading operation will be explained using FIG. 7.

(S6) Magnetic tape is rewound upon receipt of an unload command.

(S7) MPU 30 creates VCR region 11 data, comprising updated medium life management information (This will be explained in the read/write process described hereinbelow) of Table 32 in CS memory 31.

(S8) Then, the created data is written to VCR region 11 of the magnetic tape. In accordance therewith, the medium life management information 14 of VCR region 11 on the magnetic tape is overwritten with the updated medium life management information.

(S9) Then, MTU 2 executes a mechanical unloading operation, and thereafter, the medium 1 is ejected, and unloading is terminated.

Next, updating operations for medium life management information at write/read/read reverse will be explained. First, the write process will be explained in line with FIG. 8.

(S10) A write command from host 4 is communicated to MPU 30 via SCSI I/F 35, and write data from host 4 is buffered in buffer memory 36 by way of SCSI I/F 35.

(S11) MPU 30 gives instructions for tape write to MTU 2 and R/W circuit 37. R/W circuit 37 reads out data from the buffer memory 36 in one block units, and writes to the tape via the magnetic head of MTU 2.

(S12) MTU 2 detects servo errors, and R/W circuit 37 detects data errors. MPU 30 detects the error state thereof and controls retry. MPU 30 determines whether or not there is an error (data error, servo error).

(S13) When there is an error, MPU 30 determines whether or not the error is an off-track error. When it is an off-track error, MPU 30 updates the servo error information of Table 32 by adding "1" to the number of servo retries (FIG. 4).

(S14) MPU 30 counts the number of MTU 2 retries, and determines whether or not the number of retries exceeds a specified value. If the number of retries exceeds a specified value, MPU 30 executes an error end. Conversely, if the number of retries does not exceed a specified value, MPU 30 updates the data error information of Table 32 by adding the number of write retries (FIG. 5). Then, processing returns to Step S11.

(S15) MPU 30 determines whether or not R/W circuit 37 wrote an SDM. When an SDM has been written, MPU 30 updates the servo error information of Table 32 by adding the number of SDM writes (FIG. 4).

(S16) MPU 30 updates the data error information of Table 32 by adding the number of blocks written (FIG. 5). Then, MPU 30 updates the general management information of Table 32 by adding the total number of bytes written. Furthermore, MPU 30 adds the number of bytes written to the per-load number of bytes of data error information in Table 32.

(S17) MPU 30 determines whether or not there was a retry by MTU 2. If there was a retry, it updates the data error information of Table 32 by adding the number of write retries (FIG. 5). Further, MPU 30 updates data error information of Table 32 by adding the number of ECC corrections (FIG. 5).

(S18) MPU 30 determines whether or not the writing of all of the write data from host 4 has ended. When it has not ended, processing returns to Step S11.

(S19) By contrast, when writing has ended, MPU 30 instructs MTU 2 to stop the tape. Then, MPU 30 obtains tape travel time from MTU 2 management information, and updates the general management information of Table 32 by adding the tape travel time (FIG. 4). Furthermore, MPU 2 obtains the number of tape travel paths, and updates the general management information of Table 32 by adding the number of paths the tape traveled (FIG. 4).

Furthermore, MPU 30 computes the write error rate from the number of bytes written and the above-mentioned number of retries, and updates the history of write error rate information in Table 32. Then, MPU 30 calculates the error rate average value from the updated history of write error rate information. Similarly, MPU 30 updates the tracking error rate information of Table 32, and updates the average value of the tracking error rate. Then, it executes a normal end.

Thus, general management information (tape travel time, number of tape travel paths, total number of bytes written) is updated pursuant to a write operation. Further, servo error information (SDM write information, number of servo retries, tracking error rate, average value of tracking error rate) is updated. Similarly, data error information (number of blocks written, number of write retries, number of bytes written per load, number of ECC corrections, write data error rate, and average write data error rate) is updated.

Next, read/read reverse processing will be explained using FIG. 9.

(S20) A read command from host 4 is communicated to MPU 30 via SCSI I/F 35. MPU 30 instructs MTU 2 and R/W circuit 37 to execute tape read. In accordance therewith, a data read operation is performed one block at a time. The read data is transmitted to host 4 via buffer memory 36 and SCSI I/F 35.

(S21) MTU 2 detects servo errors, and R/W circuit 37 detects data errors. MPU 30 reads the error state thereof, and determines whether or not there is an error (data error, servo error).

(S22) When there is an error, MPU 30 determines whether or not the number of MTU 2 read retries exceeds a specified value. If the number of retries exceeds a specified value, error end is executed. By contrast, when the number of retries does not exceed a specified value, MPU 30 updates the data error information of Table 32 by adding the number of read/read reverse retries (FIG. 5). Then, processing returns to Step S20.

(S23) When there is no error, MPU 30 updates the data error information of Table 32 by adding the number of blocks read in (FIG. 5). Then, MPU 30 updates the general management information of Table 32 by adding the number of bytes read in (FIG. 4). Furthermore, MPU 30 adds the number of bytes read in to the per-load number of bytes (FIG. 4) of data error information in Table 32.

(S24) MPU 30 determines whether or not there was a retry by MTU 2 in a pertinent block. If there was a retry, MPU 30 updates the data error information in Table 32 by adding the number of read/read reverse retries (FIG. 5). Further, MPU 30 updates the data error information of Table 32 by adding the number of ECC corrections (FIG. 5).

(S25) MPU 30 determines whether or not the reading in of data requested from host 4 has ended. When it has not ended, processing returns to Step S20.

(S26) Conversely, when data read has ended, MPU 30 instructs MTU 2 to stop the tape. Then, MPU 30 obtains the tape travel time from MTU 2 management information, and updates the general management information of Table 32 by adding tape travel time (FIG. 4). Furthermore, MPU 30 obtains the number of tape travel paths, and updates the general management information of Table 32 by adding the number of paths the tape traveled (FIG. 4).

Furthermore, MPU 30 computes the read/read reverse error rate from the number of bytes read and the above-mentioned number of retries, and updates the history of read/read reverse error rate information in Table 32. Then, MPU 30 calculates the average value of the read/read reverse error rate from the updated history of read/read reverse error rate information, and updates the average value of the read/read reverse error rate of Table 32.

Thus, general management information (tape travel time, number of tape travel paths, total number of bytes read) is updated pursuant to a read/read reverse operation. Further, data error information (number of read/read reverse blocks, number of read/read reverse retries, number of bytes read per load, number of ECC corrections, read/read reverse data error rate, and average read/read reverse data error rate) is updated.

Thus, the updated medium life management information 14 is communicated to host 4. Further, medium life management information is analyzed in MT drive 5, and a life determination code (called a threshold reach code) is communicated to host 4.

Figure 10:
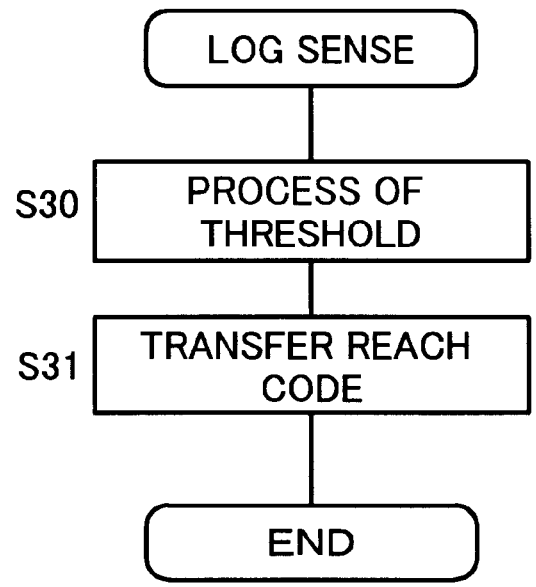
FIG. 10 is a sense command process flow chart for the constitution of FIG. 1.

This operation will be explained using the LOG sense processing flow chart of FIG. 10.

(S30) Normally, when a read/write of MT drive 5 ends, host 4 sends a LOG sense command to MT drive 5 to collect MT drive 5 LOG information. MPU 30 of MT drive 5 receives this LOG sense command, and executes analysis processing (called threshold processing) of the medium life management information 14 of Table 32 in CS memory 31. This analysis processing will be explained using FIG. 12 and so forth, which will be explained hereinbelow.

(S31) MPU 30 transmits to host 4 the analysis results (reach code) obtained via analysis processing. In accordance therewith, host 4 is able to detect the life of medium 1.

Figure 11:
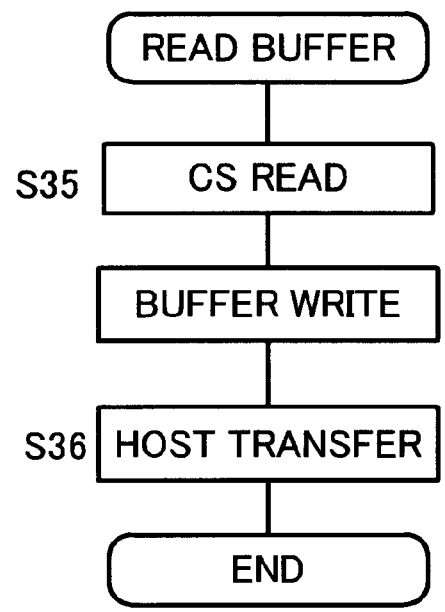
FIG. 11 is a read buffer command process flow chart for the constitution of FIG. 1.

FIG. 11 is a flow chart for read buffer processing.

(S35) Host 4 has a read buffer command as a command for reading a MT drive 5 buffer. In response to this read buffer command, a buffer region specified by the command buffer ID is transmitted to host 4. This buffer ID specifies the above-mentioned medium life management information (Table) 32.

When MPU 30 receives a buffer read command, which uses a buffer ID to specify Table 32, Table 32 is read out of CS memory 31, and stored in buffer memory 36.

(S36) The medium life management information 14 of this buffer memory 36 is communicated to host 4.

Thus, host 4 is able to directly acquire the medium life management information of medium 1. This is effective when host 4 wishes to obtain the above-mentioned analysis results and learn the causes thereof. Further, it is also possible to construct a system, which does not perform the analysis of FIG. 10 in MT drive 5. In this case, host 4 is able to make a determination concerning medium life by acquiring medium life management information via the process in FIG. 11, and analyzing the acquired medium life management information using a user's own determination criteria or the analysis process described hereinbelow.

Analysis of Medium Life Management Information

MT drive 5 performs the above-mentioned analysis of medium life management information. That is, when a specified piece of information of accumulated medium life management information 14 exceeds a threshold value, MT drive 5 reports to host 4 the fact that the medium has reached the end of its life (threshold reach).

FIG. 12 is a chart describing check items for analysis processing, and FIG. 13 is a chart describing threshold reach.

As shown in FIG. 12, there are a plurality of items to be checked, and in the histories of the number of tape travel paths, the average value of the write data error rate, the average value of the tracking rate, the minimum number of processing bytes, and number of write processing bytes, the number of these items must exceed the minimum number of processing bytes.

Furthermore, as shown in FIG. 12, as analysis modes for threshold reach, there are provided a performance-oriented mode, which stresses a drop in performance in the storage device due to an increase in retries accompanying the deterioration of a medium, and a medium-oriented mode, which stresses the use of a medium over a long period. And the items checked differ for the performance-oriented mode and the medium-oriented mode. In the performance-oriented mode, the number of paths traveled by a tape, which is an index of change due to usage, is removed from the check items. The setting of this mode is done either via the operator panel of MT drive 5 or by the host.

Threshold reach is codified so as to make it possible to readily determine which information has exceeded the threshold value when threshold reach is detected. FIG. 13 is a chart describing threshold reach codes.

Code "0x00" indicates that it is not necessary to perform threshold reach. That is, it indicates that more than a specified number of bytes was processed at each load, but the scope of this overage was not a problem.

Code "0x01" indicates that it is not necessary to perform threshold reach. That is, because processing of more than a specified number of bytes was not carried out at each load, a check of threshold reach was not performed.

Code "0x12" indicates that the average write data error rate exceeded a specified number in the performance-oriented mode. Code "0x13" indicates that the average write data error rate exceeds a specified value, and the number of tape travel paths also exceeds a specified value. Code "0x14" indicates that within the history of the past several write data error rates, the average write data error rate exceeded a specified value more than a specified number of times.

Code "0x22" indicates that the average tracking error rate exceeds a specified value in the performance-oriented mode. Code "0x23" indicates that the average tracking error rate exceeded a specified value, and the number of tape travel paths also exceeded a specified value. Code "0x24" indicates that, within the history of the past several tracking error rates, the average tracking error rate exceeded a specified value more than a specified number of times.

Code "0x32" indicates the average read/read reverse data error rate exceeded a specified value in the performance-oriented mode. Code "0x33" indicates that the average read/read reverse data error rate exceeded a specified value, and the number of tape travel paths also exceeded a specified value. Code "0x34" indicates that, within the history of the past several read/read reverse error rates, the average read/read reverse error rate exceeded a specified value more than a specified number of times.

Figure 14:
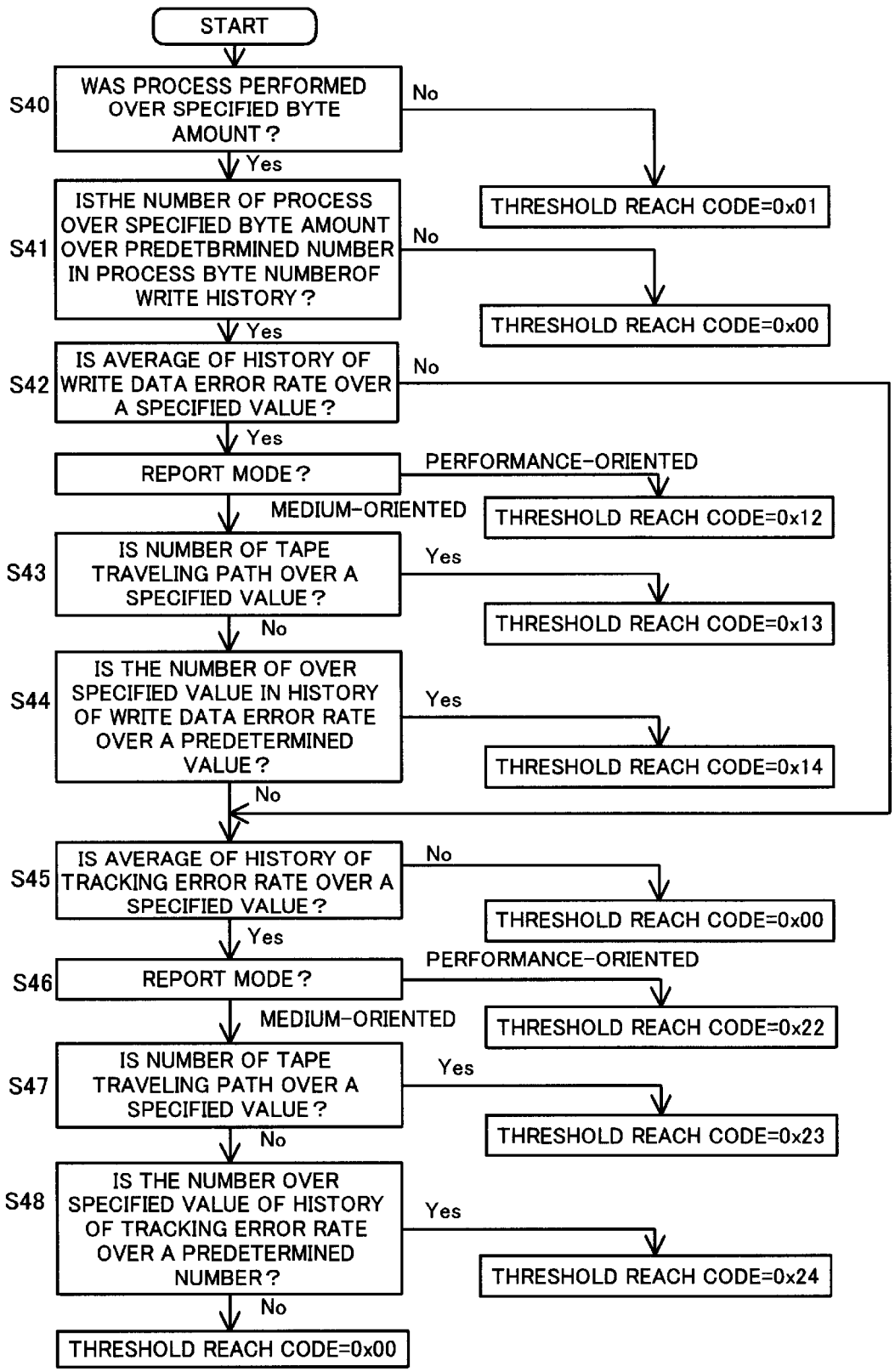
FIG. 14 is a life determination process flow chart (Part 1) for the constitution of FIG. 1.

Threshold reach determination processing will be explained using FIG. 14 and FIG. 15. FIG. 14 is a determination processing flow chart for threshold reach relative to a data write.

(S40) MPU 30 determines whether or not processing in excess of a specified number of bytes was performed during this load. When processing in excess of a specified number of bytes has not been performed, because a portion of medium 1 is not being accessed, the above-mentioned updating of medium life management information 14 only reflects the portion of medium 1 being accessed. Thus, since deterioration cannot be accurately determined even if a check is performed, threshold reach code "0x01" is set and the operation is terminated.

(S41) MPU 30 checks the history of the number of write processing bytes, and determines whether or not the number of times, which the number of write processing bytes exceeds a specified number of bytes, exceeds a specified number of times. If the number of times, which the number of write processing bytes exceeds a specified number of bytes, is less than a specified number of times, as described hereinabove, the above-mentioned history of medium life management information 14 only reflects the portion of medium 1 that is being accessed. Thus, since deterioration cannot be accurately determined even if a check is performed, threshold reach code "0x00" is set without doing a check, and the operation is terminated.

(S42) MPU 30 determines whether or not the average value of the history of the write data error rate of Table 32 exceeded a specified value. If it does not exceed a specified value, processing progresses to Step S45. When the average value of the history of the write data error rate exceeds a specified value, the reporting mode determines whether or not it is a performance-oriented mode or a medium-oriented mode. When it is a performance-oriented mode, a determination is made that storage device performance has declined due to increased retries resulting from a decline in magnetic tape write performance, threshold reach code "0×12" is set, and the operation is terminated.

(S43) In the medium-oriented mode, MPU 30 determines whether or not the number of tape travel paths of Table 32 has exceeded a specified number. When the number of tape travel paths exceeds a specified number, a determination is made that magnetic tape write characteristics have declined, and deterioration due to long-term use has also occurred, threshold reach code "0×13" is set, and the operation is terminated.

(S44) When a specified value has been exceeded within the history of write data error rates of Table 32 (from most recent to 16 times therebefore), MPU 30 determines whether or not this has occurred more than a specified number of times. When cases in which a specified value has been exceeded occur more than a specified number of times, a determination is made that magnetic tape write characteristics have declined, threshold reach code "0×14" is set, and the operation is terminated. In accordance therewith, the data error check is terminated and processing moves to a servo error check.

(S45) MPU 30 determines whether or not the average value of the history of the tracking error rate of Table 32 exceeded a specified value. If it does not exceed a specified value, it is determined that that there is no servo error abnormality, threshold reach code "0×00" is set, and the operation is terminated. At this time, even if the average value of the history of the write data error rate exceeded a specified value in Step S42, when the average value of the history of the tracking error rate does not exceed a specified value, it is treated as no problem. The reason for this is to prevent making a determination about life when there is an abnormally high value only in a portion of the write data error rate, and the average value is raised due to this.

(S46) When the average value of the history of the tracking error rate exceeds a specified value, the reporting mode determines whether or not it is a performance-oriented mode or a medium-oriented mode. When it is a performance-oriented mode, a determination is made that storage device performance has declined due to increased retries pursuant to the deterioration of the servo track recording characteristics of the magnetic tape, threshold reach code "0×22" is set, and the operation is terminated.

(S47) In the medium-oriented mode, MPU 30 determines whether or not the number of tape travel paths of Table 32 has exceeded a specified number. When the number of tape travel paths exceeds a specified number, a determination is made that the recording characteristics of the servo track have deteriorated due to deterioration resulting from using the magnetic tape numerous times, threshold reach code "0×23" is set, and the operation is terminated.

(S48) When a specified value has been exceeded within the history of tracking error rates of Table 32 (from most recent to 16 times therebefore), MPU 30 determines whether or not this has occurred more than a specified number of times. When cases in which a specified value has been exceeded occur more than a specified number of times, a determination is made that magnetic tape servo track recording characteristics have deteriorated, threshold reach code "0×24" is set, and the operation is terminated. By contrast, when cases in which a specified value has been exceeded do not occur more than a specified number of times, a determination is made that life has not ended, threshold reach code "0×00" is set, and the operation is terminated. At this time, even if the average value of the history of tracking error rates exceeded a specified value in Step S45, when the cases in which the history of the tracking error rates exceeds a specified value, but the number of times this occurred does not exceed a specified number of times, it is treated as no problem. The reason for this is to prevent making a determination about life even when there is an abnormally high value only in a portion of the tracking error rate, and the average value is raised due to this.

Threshold reach codes such as this are stored as a portion of medium life management information as shown in FIG. 4.

Next, the processing flow for threshold reach determinations relative to data read will be explained using FIG. 15.

(S50) MPU 30 determines whether or not processing in excess of a specified number of bytes was performed during this load. When processing in excess of a specified number of bytes has not been performed, as explained hereinabove, to prevent making a determination based on data of a portion of the medium, threshold reach code "0×01" is set and the operation is terminated.

(S51) MPU 30 checks the history of the number of read processing bytes, and determines whether or not the number of times that the number of read processing bytes exceeds a specified number of bytes is in excess of a specified number of times. If the number of times that the number of read processing bytes exceeds a specified number of bytes is less than a specified number of times, similar to the explanation given hereinabove, to prevent making a determination using data of one portion of the medium, threshold reach code "0×00" is set without carrying out a check, and the operation is terminated.

(S52) MPU 30 determines whether or not the average value of the history of the read data error rates of Table 32 exceeded a specified value. When the history of read data error rates does not exceed a specified value, a determination is made that magnetic tape read performance has not declined, threshold reach code "0×00" is set, and the operation is terminated.

(S53) The reporting mode determines whether or not it is the performance-oriented mode. When it is the performance-oriented mode, a determination is made that storage device performance has declined due to increased retries pursuant to the deterioration of magnetic tape read characteristics, threshold reach code "0×32" is set, and the operation is terminated.

(S54) In the medium-oriented mode, MPU 30 determines whether or not the number of tape travel paths of Table 32 has exceeded a specified number. When the number of tape travel paths exceeds a specified number, a determination is made that read characteristics have deteriorated due to deterioration resulting from the magnetic tape being used numerous times, threshold reach code "0×33" is set, and the operation is terminated.

(S55) When a specified value has been exceeded within the history of read data error rates of Table 32 (from most recent to 16 times therebefore), MPU 30 determines whether or not this has occurred more than a specified number of times. When cases in which a specified value has been exceeded occur more than a specified number of times, a determination is made that magnetic tape read characteristics have declined, threshold reach code "0×34" is set, and the operation is terminated.

When cases in which a specified value has been exceeded do not occur more than a specified number of times, a determination is made that magnetic tape read performance has not declined, threshold reach code "0×00" is set, and the operation is terminated.

Thus, the write state at write (data errors, servo errors) is analyzed, and a determination is made as to medium life. Similarly, the read state at read (data errors) is analyzed, and a determination is made as to medium life. Further, since a plurality of items is checked, an accurate determination of medium deterioration can be made. Furthermore, since the causes of medium life deterioration are codified and reported, the cause of medium life deterioration can be readily clarified.

Further, both write and read data are checked, but it is possible to check either write data only or read data only. In this case, because a decline in tape write characteristics causes a decline in read characteristics, a write-data-only check is preferable.

Furthermore, number of travel paths (distance) is utilized to determine deterioration due to use, but life can similarly be determined using travel time and total number of processing bytes as well.

Figures 16, 17:
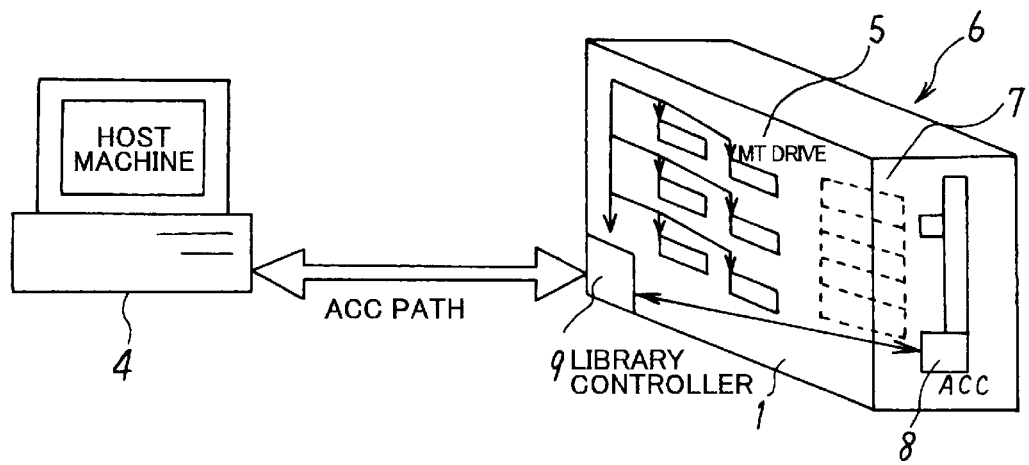
FIG. 16 is a chart describing the medium replacement display of the constitution of FIG. 1.
FIG. 17 is a schematic of a library system of another embodiment of the present invention.

FIG. 16 is an example of a medium life display. Host 4 receives analysis results from MT drive 5 resulting from the processing of FIG. 10, and a cartridge replacement request is displayed on the host 4 display device as shown in FIG. 16. Volume name (cartridge name) and the MT drive number are displayed at this time. In accordance therewith, no matter what drive or cartridge a replacement request is generated for, a determination can be readily made even if there are a plurality of drives and cartridges.

Figure 15:
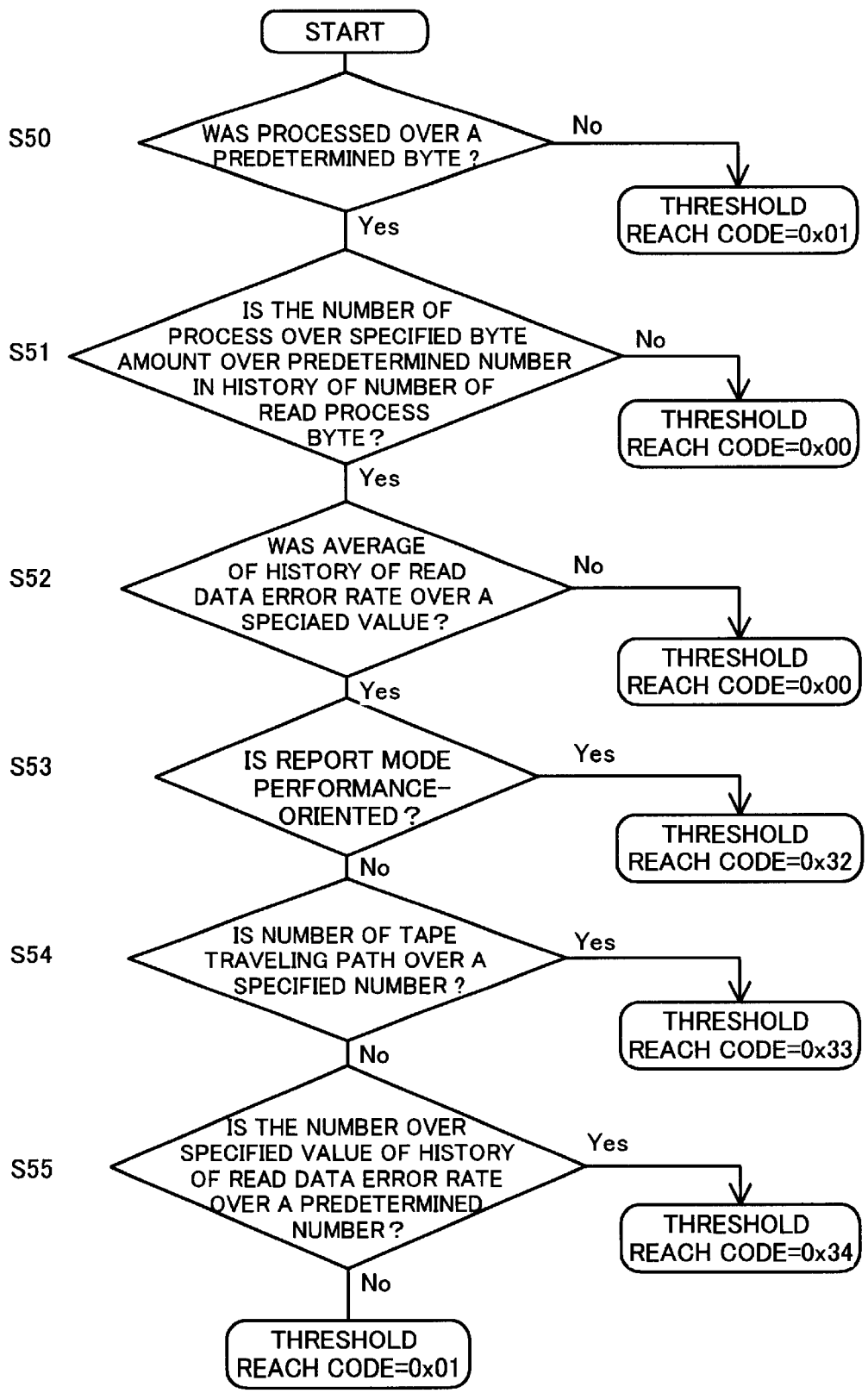
FIG. 15 is a life determination process flow chart (Part 2) for the constitution of FIG. 1.

Similarly, host 4 receives the above-mentioned medium life management information, and host 4 performs the analysis processing of FIG. 14 and FIG. 15, enabling the display of a replacement request as shown in FIG. 16.

Furthermore, the replacement request and determination codes thereof can also be displayed on the MT drive 5 operator panel.

Library System

Figures 18, 19:
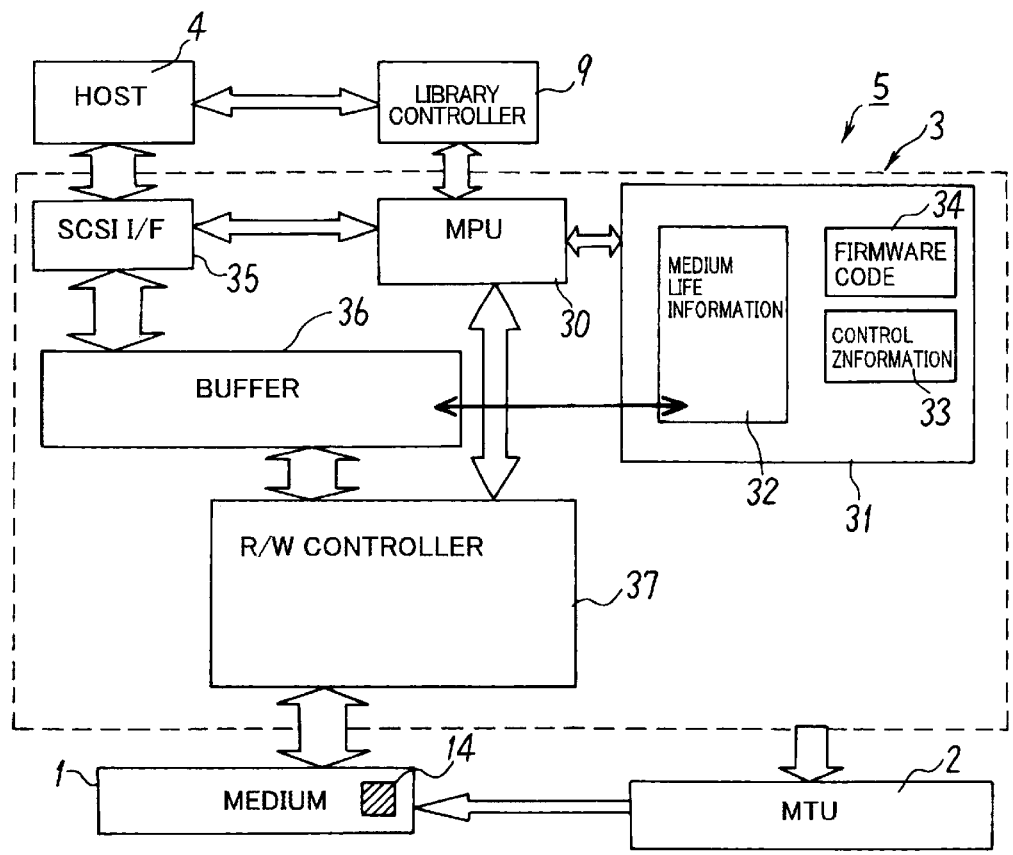
FIG. 18 is a block diagram of the constitution of FIG. 17.
FIG. 19 is a chart describing the medium replacement display of the constitution of FIG. 17.

Life management such as this is even more effective in a library system. FIG. 17 is a schematic of a storage system of another embodiment of the present invention, FIG. 18 is a block diagram thereof, and FIG. 19 is a chart describing an example of a medium life display by the host.

As shown in FIG. 17, a library system 6 constitutes MT drive 5, a storage shelf 7, an accessor 8, and a library controller 9. A plurality of magnetic tape cartridges 1 is stored on storage shelf 7. For example, between 400 and 1,000 magnetic tape cartridges 1 are stored there.

The accessor (cartridge handling mechanism) 8 extracts a cartridge specified by host 4 from the storage shelf 7, carries it to MT drive 5 and loads it. Then, accessor 8 removes a cartridge for which processing has been completed from MT drive 5, and returns it to storage shelf 7. Library controller 9 controls MT drive 5 and accessor 8.

By providing a plurality of MT drives 5 (there are six in the figure), host 4 can process cartridges one after the other without waiting for cartridge handling time.

This library system is used to build up a large capacity database. Because cartridges are stored inside the library system, it is difficult to know the replacement life of each cartridge. By utilizing MT drive 5 of the present invention in library system 6, the replacement life of each cartridge can be readily detected even in an automated system.

As shown in FIG. 18, MT drive 5 shown in FIG. 1 is connected to host 4 via library controller 9. The constitution of MT drive 5, as shown in the figure, is the same as that of FIG. 1. Data from host 4 is sent via SCSI I/F 35, and commands from host 4 are received by MPU 30 via library controller 9.

In a library system such as this, host 4 specifies the cartridge to be accessed to library controller 9. Library controller 9 controls accessor 8, and accessor 8 extracts the cartridge specified by host 4 from the storage shelf 7, carries it to MT drive 5 and loads it into MT drive 5. Then, accessor 8 removes a processed cartridge from MT drive 5, and returns it to storage shelf 7.

MT drive 5 performs read/write processing on a loaded cartridge. As described hereinabove, MT drive 5 reads out, updates and writes medium life management information 14, and manages medium life at this time.

As described hereinabove, MT drive 5 communicates medium life management information 14 to host 4 in response to a read buffer command from host 4. In accordance therewith, it becomes possible for host 4 to manage medium life. Further, in a system, wherein MT drive 5 analyzes medium life management information 14, the results of analysis are reported to host 4 in response to a host 4 LOG sense command. Thus, as shown in FIG. 19, a cartridge replacement request is displayed on the display device of the host 4 in accordance with the analysis results. The volume name (cartridge name), library system number, and MT drive number are displayed at this time. In accordance therewith, no matter which drive or cartridge a replacement request is generated for, a determination can be readily made even when there are a plurality of library systems.

Similarly, host 4 receives the above-mentioned medium life management information 14, and host 4 performs the analysis processing of FIG. 14 and FIG. 15, enabling the display of a replacement request as shown in FIG. 19.

In particular, when host 4 is in a location separate from library system 6, it becomes possible to manage the life of a cartridge 1 of library system 6 at a location separate from the operator.

Furthermore, by host 4 instructing library controller 9 to extract a cartridge for which there was a medium replacement request, it is possible for accessor 8 to eject that cartridge from library system 6.

Further, the storage medium has been described as a magnetic tape cartridge, but a magnetic disk cartridge, optical disk cartridge, or magneto-optical disk cartridge or the like can also be utilized. Furthermore, another removable, read/write-capable tape, disk, card or the like, which does not take the shape of a cartridge, can also be utilized.

As explained hereinabove, the present invention is capable of all sorts of variations within the scope of this technical concept, and these variations are included in the scope of the present invention.

INDUSTRIAL APPLICABILITY

The present invention is useful for managing the life of a storage medium. In particular, it makes it possible to accurately detect the deterioration of a storage medium because it treats operating states, such as operating time, number of data errors, and number of servo errors and the like at storage medium read/write, as management information. Thus, the present invention can prevent the wasteful replacement of a storage medium and the loss of data.

What is claimed is:

1. A method for managing the life of a storage medium in a storage device, which accesses a loaded storage medium for reading/writing data from/to said storage medium, comprising:

reading medium life management information from said loaded storage medium;

detecting an operating state of at least one of the reading and the writing of data on said storage medium, and updating said medium life management information in accordance with the results of such detection;

writing said updated medium life management information to said storage medium upon unloading the storage medium, including detecting a plurality of states of at least one of the reading and the writing of data in said storage medium, with the plurality of states being read/write characteristics of said storage medium, and updating said medium life management information according to each of said plurality of states;

analyzing each of said plurality of states of medium life management information; and determining the life of said storage medium based on the results of each analysis.

2. The method for managing the life of a storage medium according to claim 1, further comprising reporting said medium life management information to a management system for managing the life of said storage medium.

3. The method for managing the life of a storage medium according to claim 1, further comprising setting determination parameters for said determination of said life of said storage medium.

4. The method for managing the life of a storage medium according to claim 1, wherein said determination of said life of said storage medium comprises detecting a reason for said determination.

5. The method for managing the life of a storage medium according to claim 1, wherein said updating of said medium life management information comprises detecting at least one of an operating quantity, a data error state and a servo error state of at least one of the reading and the writing when data is read or written from/to said storage medium, and updating said medium life management information according to results of such detection.

6. A storage device for accessing a loaded storage medium, and reading/writing data from/to said storage medium, comprising:

read/write means for reading/writing data from/to said storage medium; and control means for controlling said read/write means, wherein said control means, develops medium life management information, which has been read from said loaded storage medium, to a memory, and thereafter, detects an operating state of at least one of the reading and the writing of data in said storage medium by said read/write means, updates said medium life management information according to results of such detection, and writes said updated medium life management information to said storage medium upon unloading the storage medium, wherein said control means detects a plurality of states of at least one of the reading and the writing of data in said storage medium, with the plurality of states being read/write characteristics of said storage medium, and updates said medium life management information according to each of said plurality of states, and wherein said control means analyzes each of the plurality of states of said medium life management information, and determines the life of said storage medium based on the respective analysis results.

7. The storage device according to claim 6, wherein said control means reports said medium life management information to a managing system for managing the life of said storage medium.

8. The storage device according to claim 6, further comprising means for setting the determination parameters of said life determination.

9. The storage device according to claim 6, wherein in said control means determination of the life of said storage medium, a reason for said determination is detected.

10. The storage device according to claim 6, wherein said control means detects at least one of an operating quantity, a data error state and a servo error state of at least one of the reading and the writing when data is read or written from/to said storage medium, and updates said medium life management information according to results of such detection.

11. The storage device according to claim 6, wherein said read/write means comprises means for reading/writing data from/to a magnetic tape cartridge.

12. A storage system comprising:

a storage device for accessing a loaded storage medium, and reading/writing data from/to said storage medium; and a managing device for managing said storage device;

wherein said storage device reads medium life management information from said loaded storage medium, and thereafter, detects an operating state of at least one of the reading and the writing of data in said storage medium, updates said medium life management information according to results of such detection, and writes said updated medium life management information to said storage medium upon unloading the storage medium, and, in addition, reports information related to said medium life management information to said managing device in response to a request from said managing device, wherein said storage device detects a plurality of states of at least one of the reading and the writing of data in said storage medium, with the plurality of states being read/write characteristics of said storage medium, and updates said medium life management information according to each of said plurality of states, and wherein said storage device analyzes each of the plurality of states of said medium life management information, and determines the life of said storage medium based on the respective analysis results.

13. The storage system according to claim 12, wherein said storage device analyzes said medium life management information, determines the life of said storage medium, and reports said determination results to said managing device.

14. The storage system according to claim 12, wherein said storage device comprises a library device, said library device comprising:
   a storage drive for accessing a loaded storage medium, and for reading/writing data from/to said storage medium; and
   an accessor for loading a desired storage medium into said storage drive, and removing said storage medium from said storage drive.

15. A storage medium stored program for managing the life of a storage medium in a storage device, which accesses a loaded storage medium for reads/writes data from/to said storage medium, wherein said program comprises:
   a program for reading medium life management information from said loaded storage medium;
   a program for updating said medium life management information according to an operating state of at least one of the reading and the writing of said storage medium data, wherein said updating program detects a plurality of states of at least one of the reading and the writing of data in said storage medium, with the plurality of states being read/write characteristics of said storage medium, and updates said medium life management information according to each of said plurality of states;
   a program for writing said updated medium life management information to said storage medium upon unloading the storage medium; and
   a program for analyzing each of said plurality of states of medium life management information, and for determining the life of said storage medium based on the results of each analysis.

16. A storage device for accessing a loaded storage medium, and reading/writing data from/to said storage medium, comprising:
   read/write unit to read/write data from/to said storage medium; and
   control unit to control said read/write unit,
   wherein said control unit, develops medium life management information, which has been read from said loaded storage medium, to a memory, and thereafter, detects an operating state of at least one of the reading and the writing of data in said storage medium by said read/write unit, updates said medium life management information according to results of such detection, and writes said updated medium life management information to said storage medium upon unloading the storage medium,
   wherein said control unit detects a plurality of states of at least one of the reading and the writing of data in said storage medium, with the plurality of states being read/write characteristics of said storage medium, and updates said medium life management information according to each of said plurality of states, and
   wherein said control unit analyzes each of the plurality of states of said medium life management information, and determines the life of said storage medium based on the respective analysis results.

17. The storage device according to claim 16, wherein said control unit reports said medium life management information to a managing system for managing the life of said storage medium.

18. The storage device according to claim 16, further comprising a setting unit to set the determination parameters of said life determination.

19. The storage device according to claim 16, wherein in said control unit determination of the life of said storage medium, a reason for said determination is detected.

20. The storage device according to claim 16, wherein said control unit detects at least one of an operating quantity, a data error state and a servo error state of at least one of the reading and the writing when data is read or written from/to said storage medium, and updates said medium life management information according to results of such detection.

21. The storage device according to claim 16, wherein said read/write unit reads/writes data from/to a magnetic tape cartridge.

* * * * *

UNITED STATES PATENT AND TRADEMARK OFFICE
CERTIFICATE OF CORRECTION

PATENT NO. : 6,707,630 B2
DATED : March 16, 2004
INVENTOR(S) : Koichi Doi et al.

It is certified that error appears in the above-identified patent and that said Letters Patent is hereby corrected as shown below:

<u>Title page,</u>
Item [57], ABSTRACT,
Line 11, change "s" to -- is --.

Signed and Sealed this

Twenty-fifth Day of May, 2004

JON W. DUDAS
*Acting Director of the United States Patent and Trademark Office*